United States Patent [19]

Head et al.

[11] Patent Number: 4,627,071

[45] Date of Patent: Dec. 2, 1986

[54] DISTORTION ANALYZER FOR QUADRATURE DEMODULATED DATA

[75] Inventors: Manley J. Head, Wylie; William C. Smith; Paul E. Pepmiller, both of Richardson, all of Tex.

[73] Assignee: Rockwell International Corporation, El Segundo, Calif.

[21] Appl. No.: 670,432

[22] Filed: Nov. 9, 1984

[51] Int. Cl.[4] .............................................. H04B 3/46
[52] U.S. Cl. ...................................... 375/10; 375/39; 364/514; 371/22
[58] Field of Search ...................... 375/10, 39; 370/13, 370/17; 455/67; 371/15, 22; 324/77 R, 86, 91; 364/481, 514, 521

[56] References Cited

U.S. PATENT DOCUMENTS

| | | | |
|---|---|---|---|
| 3,689,884 | 9/1972 | Tew, Jr. | 371/22 |
| 4,176,317 | 11/1979 | Manfreda | 371/22 |
| 4,381,546 | 4/1983 | Armstrong | 364/514 |
| 4,449,223 | 5/1984 | Liskov et al. | 375/10 |
| 4,495,585 | 1/1985 | Buckley | 364/514 |

Primary Examiner—Benedict V. Safourek
Attorney, Agent, or Firm—V. Lawrence Sewell; H. Fredrick Hamann

[57] ABSTRACT

Method and apparatus for displaying measures of distortion present at the outputs of a quadrature demodulator. From each of the in-phase and quadrature channels of the demodulator there are acquired n parallel bits, m of these bits being the demodulator data output of the associated channel and (n−m) bits being error bits for the channel. The n bits for each channel are converted to a signal acceptable to a plot display device and applied to orthogonal axes of the device. In addition, an absolute value of the (n−m) error bits for each channel is derived. This absolute value is filtered and displayed, as by a meter, for each channel.

5 Claims, 8 Drawing Figures

| I3 | I2 | I1 | C |
|----|----|----|---|
| 0 | 0 | 0 | 3 |
| 0 | 0 | 1 | 2 |
| 0 | 1 | 0 | 1 |
| 0 | 1 | 1 | 0 |
| 1 | 0 | 0 | 0 |
| 1 | 0 | 1 | 1 |
| 1 | 1 | 0 | 2 |
| 1 | 1 | 1 | 3 |

DISTORTION ANALYZER FOR QUADRATURE DEMODULATED DATA

BACKGROUND AND SUMMARY OF THE INVENTION

This invention relates to analyzing the distortion present at the outputs of a quadrature demodulator.

It is important in the design and alignment of quadrature modulation systems, such as quadrature amplitude modulated (QAM) systems to have a useful measure of distortion. The conventional solution to this problem is to measure bit error rate (BER), a process requiring the accumulation of an error count for a period of minutes, in the case of a low BER. The present invention measures and displays distortion in real time, greatly facilitating adjustment of a quadrature modulated system.

In accordance, with the present invention, there is provided method and apparatus for displaying measures of distortion present at the outputs of a quadrature demodulator. From each of the in-phase and quadrature channels of the demodulator, there are acquired n parallel bits, m of these bits being the data output of the associated channel, and (n−m) bits being error bits for the channel. The n bits for each channel are converted to signals acceptable to a device such as an oscilloscope which can display them with respect to orthogonal axes. The resulting signals associated with the in-phase and quadrature channels are applied to the orthogonal axes of the display device.

The resulting display corresponds to a graph of the m x m quadrature modulation states plotted on Q (quadrature) and I (in-phase) axes. The presence of various forms of distortion manifests itself as additional points displayed in addition to the m x m modulation states. Adjustments which may be made in the system at points prior to the demodulator output can readily be observed to have an effect on distortion by means of this display.

Further in accordance with the invention, there is generated the absolute value of the (n−m) bits for each channel. The absolute value for each channel is filtered and displayed, as by a meter. The resulting displayed values provide useful measures of distortion for the in-phase and quadrature channels. As with the display on orthogonal axes, adjustments in the quadrature modulation system can be seen in their effect on these displayed distortion values.

DESCRIPTION OF PREFERRED EMBODIMENT

Figure 1:
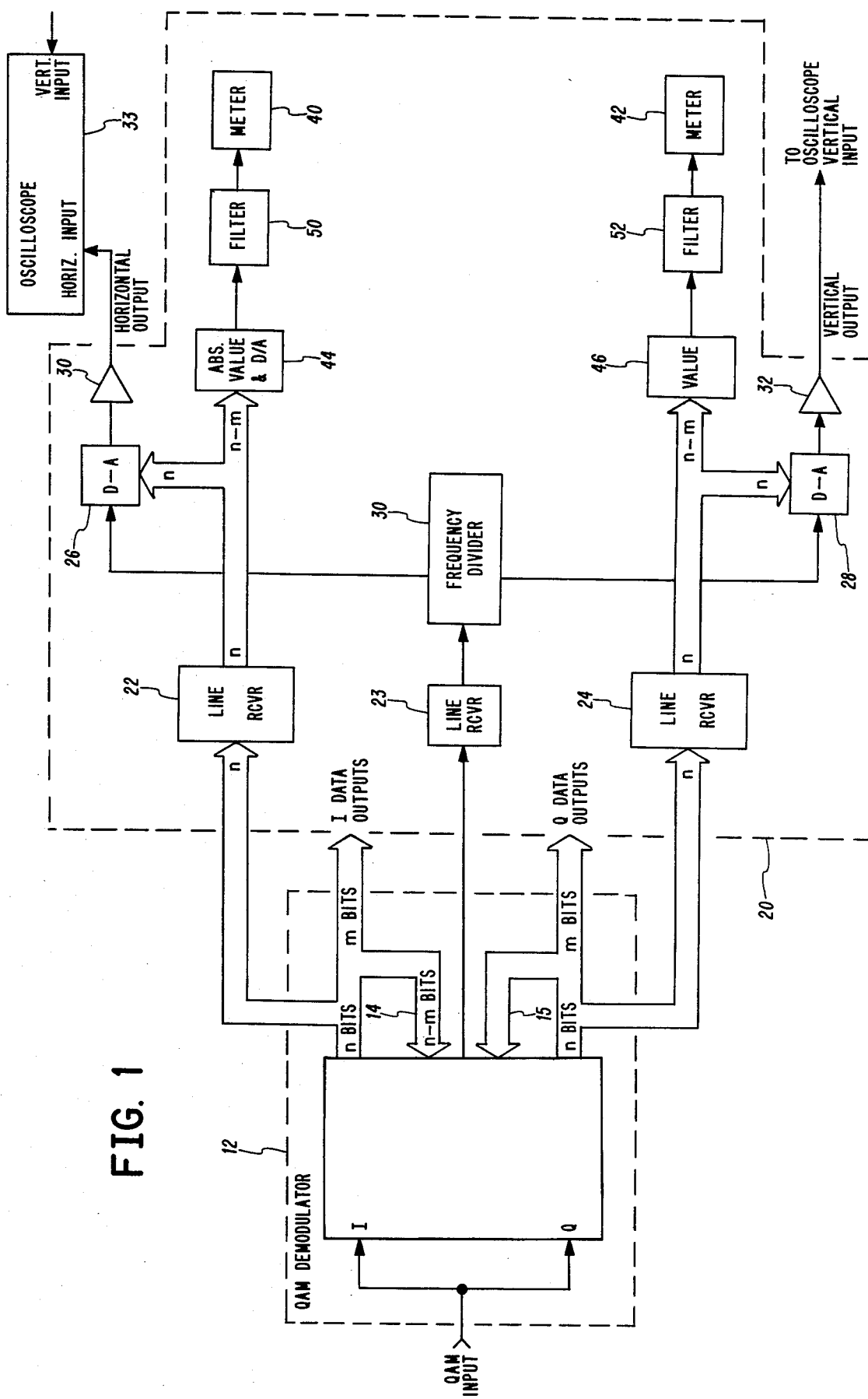
FIG. 1 is a block diagram of a distortion analyzer according to the invention.

FIG. 1 is a block diagram of a distortion analyzer in accordance with the invention. A quadrature amplitude modulated (QAM) demodulator 12 is shown receiving a QAM input and splitting it into in-phase (I) and quadrature (Q) components. In the output stages of the demodulator, for each of the I and Q channels, an analog-to-digital converter, not shown, converts the output basebond analog waveform to n parallel bits. The most significant m of the n bits for each channel form the demodulator data output for that channel. For example, in a 16 QAM system, m is equal to two, so that the two channels provide a total of four output bits and $2^4$ or 16 output states. The other (n−m) bits of each output represent "error bits" as described in connection with FIG. 2 and are available to be used in a feedback relationship in the demodulation process. This is indicated in the figure by arrows 14 and 15 showing all or some of the (n−m) bits being thus used.

Distortion analyzer 20 acquires, in the preferred embodiment, all n bits from each channel of the demodulator. For the purpose of describing an exemplary embodiment, the values n=6 and m=2 will be assumed. In addition, it receives a clock synchronized with the acquired bits. The bits and clock are received a shown in the drawing by line receivers 22–24.

Distortion analyzer 20 has two parts, one displaying a distortion figure with a meter and the other displaying a measure of distortion on an oscilloscope or similar display. The oscilloscope display will be described first.

The n parallel bits from line receivers 22 and 24 are latched into digital-to-analog converters 26 and 28 respectively. The latch clock is derived from the clock at line receiver 23 by dividing down to a rate acceptable by the oscilloscope on which there is to be a display. This is accomplished by frequency divider 30, which can be a hexadecimal counter. If the output baud rate of the demodulator is for example 33 Mbs, then a division of a clock at the baud rate by 64 will be acceptable for most oscilloscopes. Digital-to-analog converter 26 converts the received parallel n bits to an analog signal, which is applied by means of buffer amplifier 30 to the horizontal channel of an associated oscilloscop 33. Converter 28 converts its n bits to an analog signal which is applied by a buffer amplifier 32 to the vertical channel of the oscilloscope. The resulting display is represented by the plot in FIG. 2.

Figure 2:
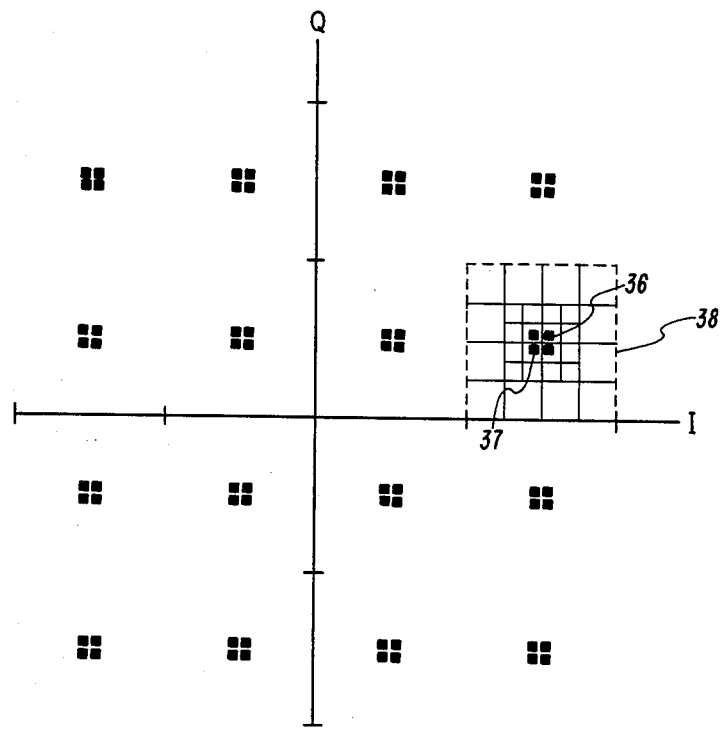
FIG. 2 is an illustration of an oscilloscope display, in accordance with the invention, of quadrature amplitude modulation.

The oscilloscope axes corresponding to the in-phase and quadrature channels have been labeled I and Q, respectively, in FIG. 2. The small spots such as spot 36 in the figure represent light spots on the oscilloscope display. The particular display represented in FIG. 2 corresponds to an output from the demodulator which contains all the states of a 16 QAM system, without distortion. In accordance with QAM conventions, the two most significant bits from the I and Q channels, taken together designate one of the 16 squares, such as square 38, each containing a cluster of four spots. For example, the square 38 containing spot 36 would correspond to I output bits 11 and Q output bits 10.

The four less significant bits of the six assumed bits, that is, the error bits, determine the position of the spot within one of the 16 squares. For example, spot 36 would correspond to I bits of 111000 and Q bits of 101000. Spot 37 has I bits 110111 and Q bits of 100111.

The ideal QAM state is in the center of each square, but the center is on the dividing line between digital values. As a result, the observed bit values tend to split between those four values adjacent to center of the square as shown. To the extent that there is distortion present at the output of the demodulator 12, the oscilloscope will display a deviation from the pattern shown in FIG. 2 of four spots clustered at the center of each of the squares corresponding to the 16 QAM states.

Figure 3A:
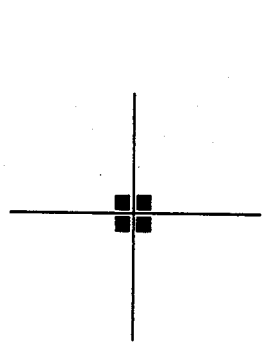
FIGS. 3A and 3B are enlarged view of a portion of the display as in FIG. 2, showing the effect of one kind of distortion.
Figure 3B:
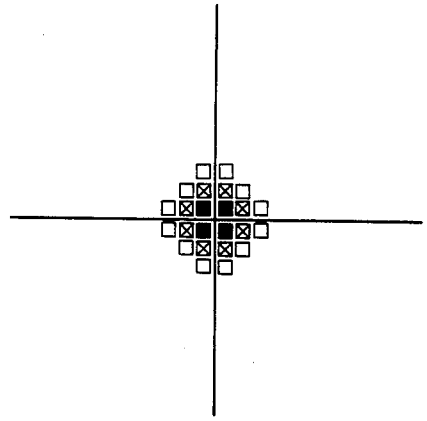

FIG. 3A is an enlarged version of the ideal four spot pattern for one of the QAM states, while FIG. 3B illustrates the display provided by the invention when random noise is present in the demodulator output. The spots or squares with lines inside them represent dimmer spots than those which are completely black. The dimmer spots correspond to values which occur less frequently than the bright spots. The open squares or spots are even dimmer and less frequently occurring than those with lines inside. Indeed, some of the dimmer spots may be seen to flicker. As the noise increases, the size of the pattern in FIG. 3B increases. As adjustments are made to the quadrature modulated system, it may be possible to cause the pattern of FIG. 3B to collapse to that of FIG. 3A. Since the display varies immediately as adjustments are made, those skilled in the art will readily appreciate that it represents a valuable tool in circuit design and alignment procedures.

The illustrations of FIGS. 2 and 3 are for (n−m) equal to four. These four error bits provide a very useful display. In theory, one error bit can provide some display of a measure of distortion under some circumstances. One bit would correspond to dividing square 38 into four subsquares. One of these subsquares could be discernible brighter than the others indicating a greater occurrence of the corresponding bit value. Preferably, more error bits are used, in order to provide greater resolution. In general, as a greater number of error bits are used in the oscilloscope display, the pattern of four ideal spots around the center of the square is smaller, and smaller levels of distortion away from this ideal pattern can be observed. It can be appreciated that beyond a certain number of error bits, there is no practical advantage, and indeed the size of the spots like spot 36 in the display may become unduly small.

Figures 4, 5A, 5B:
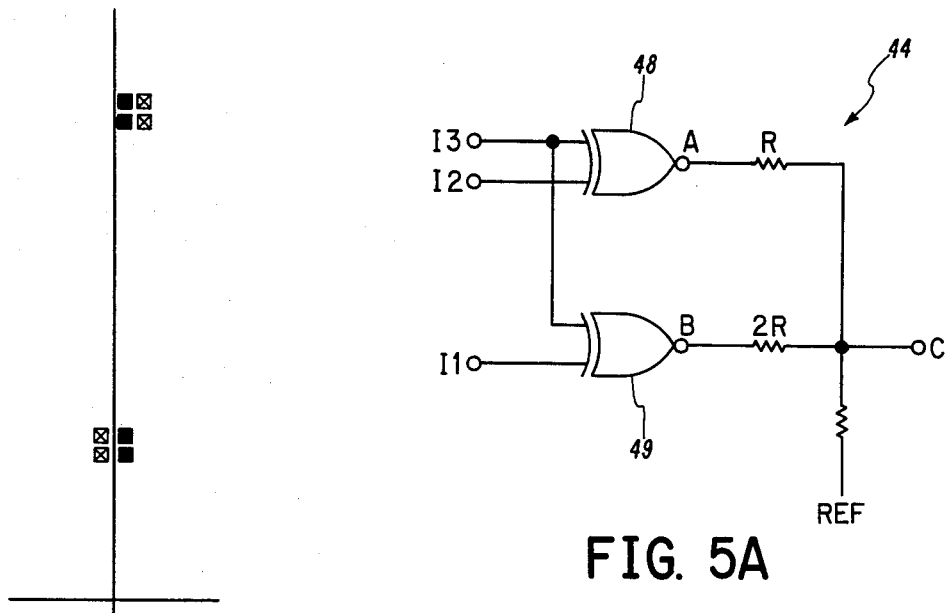
FIG. 4 is an enlarged illustration of a portion of the display as in FIG. 2, showing the effect of another kind of distortion.
FIGS. 5A and 5B are a schematic circuit diagram of an absolute value circuit in the analyzer of FIG. 1.

FIG. 4 shows a display corresponding to imperfect quadrature between the channels of the demodulator output. Four of the QAM states all having the same two I data bits are shown, with a vertical line added for comparisons. It can be ssen in the top cluster of spots, that the values which occur are to the right of the vertical line. Then the distribution of values moves progressively to the left going down the page. Again, if a QAM system were being adjusted, the display of FIG. 4 could change in real time to reflect changes in the circuit away from or toward the ideal of FIG. 2.

In addition to the oscilloscope display, distortion analyzer 20 provides a display of a measure of distortion for each of the I and Q channels on meters 40 and 42, respectively. The measure of distortion is derived from the (n−m) error bits. In a practical embodiment of the invention, used with a 16 QAM demodulator having four error bits available, it was found that a satisfactory indication on meters 40 and 42 was obtained using only three of the four bits. As with the oscilloscope display, the use of more error bits provides greater resolution, and there is a point beyond which further resolution is not useful.

In the preferred embodiment, the three most significant of the error bits in each channel are applied to absolute value circuits 44 and 46, each of which provides an analog output which is the absolute value of the digital input. The details of a suitable absolute value circuit are shown in FIG. 5. In FIG. 5A, the three error bits, 13 being the most significant one, are connected to the inputs of exclusive-NOR gates. The outputs of the gates are summed through resistors, the resistor connected to the output of gate 49 having twice the resistance of that connected to the output of gate 48. The resulting operation is illustrated by the chart of FIG. 5B. The output C of the circuit is zero for bit values corresponding to the center of the square 38 in FIG. 2 and increases for bit values extending away from the center of the square. Those skilled in the art will be able to understand from FIG. 5B, that a plurality of error bits are required in order to provide a variable measure of distortion from the absolute value circuit 44.

The outputs of the absolute value circuits 44 and 46 in FIG. 1 are filtered by filters 50 and 52, before application to meters 40 and 42, respectively. In actuality, if meters 40 and 42 are analog meters, then they can mechanically provide some of the filtering required for a readable display of distortion. The function of meters 40 and 42 can be performed by a number of devices, including a digital numeral display and a bar graph displayed on an LCD dot matrix. In such cases, filters 50 and 52 should be such low pass elements as are required to provide a display which is steady in the absence of changes in the quadrature modulation system.

The result of the absolute value circuit, filtering and metering of error bits is to display a measure of distortion which can be used as a standard during adjustment of the quadrature modulation system. As with the oscilloscope display, the distortion measure changes in real time in response to adjustments there being no requirement to accumulate errors over an extended period.

Figure 6:
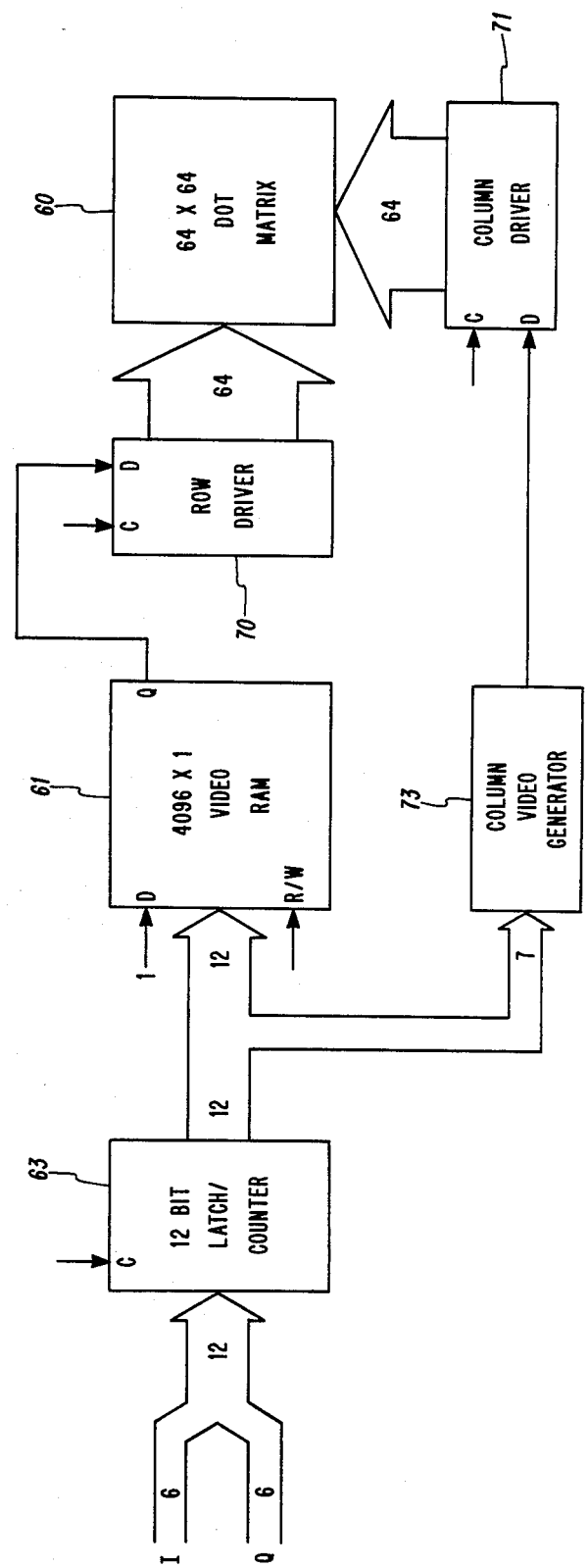
FIG. 6 is a block diagram of a circuit for creating a display of the type shown in FIG. 2, employing a dot matrix.

FIG. 6 shows circuitry for forming the display of FIG. 2 on an LCD dot matrix 60. A 4096×1 video RAM 61 is used to store indications of which dots of the 64×64 matrix 60 are to be illuminated. A dot will be turned on when a logic one is stored in the corresponding memory location of the RAM 61.

For n assumed to be equal to six, six bits from the I channel and six bits from the Q channel are latched into a twelve bit latch/counter 63 at a submultiple of the band rate. The twelve bits in latch 63 form an address in RAM 61 to which a logic one is written. Thus, at the beginning of a sample period, the RAM is filled with logic zeroes, and as various sample values occur for the group of 12 bits, the RAM locations corresponding to various dots of the matrix are written with logic ones. At the end of the sample period, latch/counter 63 is used as a counter to sequentially address each location of the RAM 61, reading out a serial bit stream of the stored logic ones and zeros to the row driver 70 of the dot matrix 60. The seven lower order bits of the read address sequence to RAM 61 are used by column video generator 73 to generate a bit stream comprises sixty-four logic zeroes separated by logic ones, so that the dot matrix is loaded column by column from the video RAM, scanning from left to right, one column at a time.

After a display period, the matrix is blanked and the described sample and display cycle is repeated. One example of a suitable rate for repeating the cycle is 120 Hz. The resulting display provides the operation and advantages which were described with respect to FIG. 2 in terms of an oscilloscope.

We claim:

1. Apparatus for displaying measures of distortion present in the outputs of a QAM demodulator having n parallel bits for each of in-phase and quadrature channels, the m most significant of the n bits for each channel being the data output thereof and the remaining $(n-m)$ bits representing error bits, said displaying including using a device which displays a plot of variables with respect to orthogonal axes, said apparatus comprising:

means for acquiring from said demodulator, for each of said in-phase and quadrature channels, at least the most significant $(m+1)$ said n parallel bits;

means for converting, for each of said channels, the associated group of acquired bits, treated as a digital number, to a signal that is acceptable to said plot display device;

means for providing each of said signals for said channels associated with said two groups of acquired bits to a different one of said plot display device axes for display;

means for deriving an error bit word from said n bits for each of said channels, each said word including a plurality of the most significant of the $(n-m)$ bits for the associated channel;

means for generating an absolute value of said error bit word, for each of said channels;

means for filtering the absolute value for each of said channels; and means for displaying the filtered absolute value for each of said channels.

2. The apparatus of claim 1, wherein said means for providing includes means for providing said signals to display axes of an oscilloscope, and said converting includes converting said group of acquired bits to an analog signal at a rate acceptable for display of said analog signals by the oscilloscope.

3. The apparatus of claim 1, wherein said plot display device includes a dot matrix device, and said converting includes generating digital signals acceptable to said dot matrix device.

4. The apparatus of claim 3, wherein said demodulator includes a clock synchronized with respect to said n bits and said converting further includes latching the bits of each group of bits to be converted and deriving from sid clock a conversion clock for timing said latching and converting at said acceptable rate.

5. A method of displaying a measure of distortion present in the outputs of a QAM demodulator having n parallel bits for each of in-phase and quadrature channels, the m most significant of said bits for each channel being the data output thereof and the remaining $(n-m)$ bits representing error bits, said method comprising the steps of:

acquiring an error bit word from said demodulator for each of said channels, each said word including a plurality of the most significant of the $(n-m)$ bits for the associated channel;

generating an absolute value of said error bit word, for each of said channels;

filtering the absolute value for each of said channels; and displaying the filtered absolute value for each of said channels.

* * * * *